(12) United States Patent
Delaplace

(10) Patent No.: US 7,850,125 B2
(45) Date of Patent: Dec. 14, 2010

(54) METHOD AND DEVICE FOR REDUCING THE WAKE VORTICES OF AN AIRCRAFT IN THE APPROACH/LANDING PHASE

(75) Inventor: Franck Delaplace, Toulouse (FR)

(73) Assignee: Airbus France, Toulouse (FR)

( * ) Notice: Subject to any disclaimer, the term of this patent is extended or adjusted under 35 U.S.C. 154(b) by 320 days.

(21) Appl. No.: 11/737,438

(22) Filed: Apr. 19, 2007

(65) Prior Publication Data

US 2007/0170313 A1 Jul. 26, 2007

(30) Foreign Application Priority Data

Apr. 21, 2006 (FR) .................................. 06 03527

(51) Int. Cl.
*G05D 1/00* (2006.01)
(52) U.S. Cl. ...................... 244/183; 244/194
(58) Field of Classification Search .............. 244/76 R, 244/194, 183, 182, 195, 198, 199.2, 200.1; 701/3
See application file for complete search history.

(56) References Cited

U.S. PATENT DOCUMENTS 3,618,880 A * 11/1971 Hagaman et al. ............ 244/113

| | | | |
|---|---|---|---|
| 7,159,825 B2 * | 1/2007 | Seve ........................... | 244/203 |
| 7,263,414 B2 * | 8/2007 | Chardon et al. ................ | 701/4 |
| 7,338,018 B2 * | 3/2008 | Huynh et al. ................ | 244/215 |
| 2005/0065672 A1 | 3/2005 | Chardon et al. | |
| 2005/0242243 A1 | 11/2005 | Seve | |

FOREIGN PATENT DOCUMENTS

| EP | 1510455 | 3/2005 |
|---|---|---|
| EP | 1568605 | 8/2005 |
| WO | 9900297 | 1/1999 |

OTHER PUBLICATIONS

Preliminary Search Report dated Jan. 15, 2007 with English translation.

* cited by examiner

*Primary Examiner*—Tien Dinh
*Assistant Examiner*—Michael Kreiner
(74) *Attorney, Agent, or Firm*—Dickinson Wright PLLC

(57) ABSTRACT

The invention relates to a method and device for reducing the wake vortices of an aircraft during the approach/landing phase. Spoilers are automatically ordered to deploy when lift-augmenting aerodynamic surfaces are ordered to deploy, and are automatically ordered to retract when at least one of the following three conditions holds: the angle of incidence $\alpha$ of the aircraft is equal to or greater than an incidence threshold $\alpha s$; the speed Vc of the aircraft is equal to or less than a speed threshold Vs; and the aircraft is instigating a go-around maneuver.

10 Claims, 2 Drawing Sheets

METHOD AND DEVICE FOR REDUCING THE WAKE VORTICES OF AN AIRCRAFT IN THE APPROACH/LANDING PHASE

The present invention relates to a method and a device for piloting an aircraft on landing, said aircraft being provided with spoilers, at least one of which, preferably the outermost, is in the deployed position on each wing, with the aim of eliminating the wake vortices produced by said aircraft.

BACKGROUND OF THE INVENTION

It is known that an aircraft produces wake vortices behind it which constitute a risk, or at the very least an impediment, for a following aircraft, on account of the strong disturbances that these wake vortices engender in the aerodynamic flow. So, to reduce such risks, it is customary to impose a regulatory separation distance between two aircraft, one of which is following the other, thus greatly slowing down the air traffic in the vicinity of airports.

DESCRIPTION OF THE PRIOR ART

In order to attempt to improve this situation and to reduce said regulatory separation distance as far as possible, numerous methods for dissipating the wake vortices as quickly as possible have already been proposed, some of these methods consisting in creating, with the aid of the aerodynamic surfaces of the aircraft, turbulent flows able to accelerate the destruction of the wake vortices which it produces. For example, document WO-99/00297 describes such a method involving, among other things, the deployment of the spoilers.

On account of their installation in the upper surface of the wings of aircraft, spoilers are particularly effective, in the deployed position, for producing turbulent flows able to counteract the wake vortices. There is therefore a certain advantage in using them.

However, this effectiveness against wake vortices is accompanied by a significant increase in the drag of the aircraft, thus greatly limiting the possibilities of using the spoilers to destroy the wake vortices.

Moreover, when the aircraft is in the approach and landing phase, with maximum lift, the act of deploying at least one spoiler on each wing in a symmetric manner will reduce the coefficient of maximum lift of the aircraft and hence give rise to an increase in the approach speed and energy of the aircraft on landing. This increase in energy, which may be up to 10%, will therefore give rise, in turn, to an increase in the length of runway required to allow said aircraft to come to a complete stop.

The object of the present invention is to remedy these drawbacks by making it possible to use the effectiveness of the spoilers to counter the wake vortices.

SUMMARY OF THE INVENTION

To this end, according to the invention, the method for piloting, on the approach and on landing, an aircraft comprising two symmetric wings provided with:
  deployable and retractable lift-augmenting aerodynamic surfaces able to confer either a smooth configuration or at least one lift-augmented configuration on said wings; and
  deployable and retractable spoilers; according to which method at least two symmetric spoilers carried respectively by said wings, are deployed in a symmetric manner so as to counteract the wake vortices produced by said aircraft, is noteworthy in that:
  said spoilers are automatically ordered to deploy when said lift-augmenting aerodynamic surfaces are themselves ordered to deploy so as to confer an approach and landing lift-augmented configuration on said wings; and
  said spoilers thus deployed are ordered automatically to retract when at least one of the following three conditions holds:
    the angle of incidence $\alpha$ of the aircraft is equal to or greater than an incidence threshold;
    the speed of the aircraft is equal to or less than a speed threshold; and
    the aircraft is instigating a go-around maneuver.

Thus, according to the invention, since the deployment of the spoilers is envisaged to occur in conjunction with that of the lift-augmenting aerodynamic surfaces, the stalling incidence and the stalling speed of the aircraft would have to be determined taking account of the deployment of said spoilers. However, by virtue of the automatic retraction of the spoilers that is provided for by the invention, the configuration of the wings of the aircraft can change fairly quickly, so that, in practice, the stalling incidence and the stalling speed may be determined with the configuration reached at the end of the automatic retraction of the spoilers.

Of course, it is necessary to choose said incidence threshold and said speed threshold appropriately.

Said incidence threshold must be low enough to allow the deployed spoilers to retract before the stalling incidence is reached. To do this, said incidence threshold may be less than the stalling incidence with spoilers retracted, minus an incidence safety margin which depends on the duration of retraction of said spoilers and which is equal to a few degrees, for example of the order of 4°. However, said incidence threshold must be large enough so that, within the context of the normal use of the aircraft, retraction of the spoilers cannot be activated. For this purpose, said incidence threshold must be greater than the incidence allowing the aircraft to perform at least one 40° turn, when said aircraft is at its approach speed.

Likewise, said speed threshold must be, at the same time, low enough and large enough. In a symmetrical manner to what was stated hereinabove in respect of said incidence threshold, said speed threshold must be greater than the stalling speed with spoilers retracted plus a speed safety margin depending on the duration of retraction of said spoilers and less than the approach speed, with a margin of at least 10 to 15 kts.

To dynamize the comparisons with said thresholds, it is advantageous for:
  the position of the incidence $\alpha$ with respect to said incidence threshold $\alpha s$ to be determined by comparing the expression $\alpha + K1 \cdot q$ with said threshold $\alpha s$, $K1$ being a positive constant coefficient and $q$ being the pitch rate of said aircraft (that is to say the derivative of the incidence with respect to time);
  the position of the speed $Vc$ of the aircraft with respect to said speed threshold $Vs$ to be determined by comparing the expression $Vc + K2 \cdot dVc/dt$ with said threshold $Vs$, $K2$ being a positive constant coefficient and $dVc/dt$ the acceleration of said aircraft.

The condition for the automatic retraction of the spoilers relating to a possible go-around is of course intended to eliminate the problem that would arise through an increase in drag in such a phase. A go-around maneuver can be detected through the aircraft's engine throttle levers or through automatic thrust control on "go-around".

It will be noted that, since deployment and retraction of the spoilers is automatic, no additional load is imposed on the pilot of the aircraft by the implementation of the present invention.

In order to ensure that spoiler retraction cannot occur close to the ground, it is possible to increase said incidence threshold and decrease said speed threshold below an altitude threshold, for example of the order of 15 meters.

For the implementation of the method in accordance with the present invention, it is possible to use a device comprising means for controlling the deployment of said spoilers which are coupled with the deployment of the lift-augmenting aerodynamic surfaces, said device moreover comprising:

first comparison means for comparing the incidence α of the aircraft with said incidence threshold αs;

second comparison means for comparing the speed Vc of the aircraft with said speed threshold Vs;

logic means for receiving the results of the comparisons performed by said first and second comparison means, as well as a cue representative of a go-around manoeuvre and cues representative of the various configuration states conferred on said wings by said lift-augmenting aerodynamic surfaces; and switching means controlled by said logic means and allowing either the deployment of said spoilers by said deployment means, or the retraction of said spoilers.

The figures of the appended drawing will elucidate the manner in which the invention may be practiced. In these figures, identical references denote similar elements.

Figure 1:
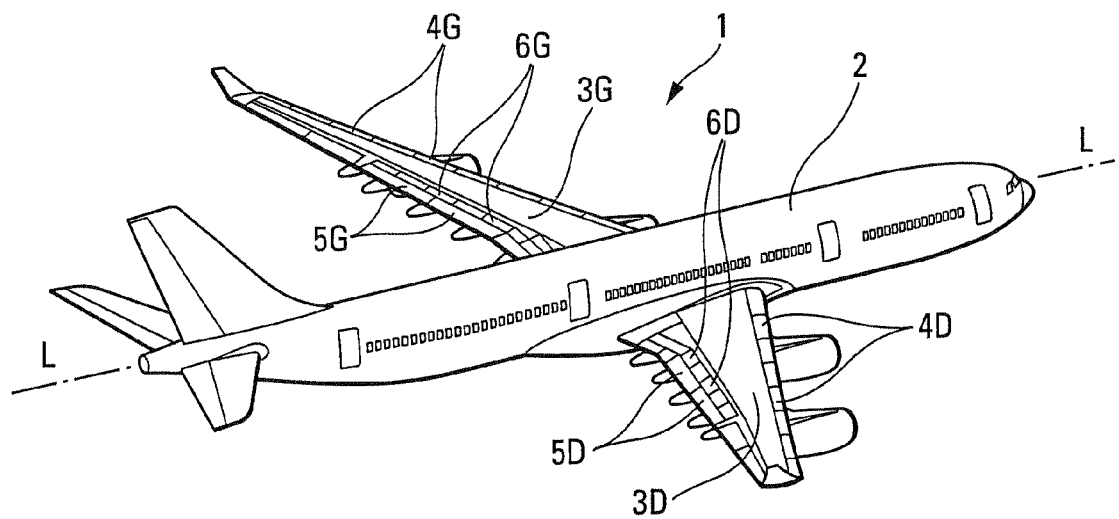
FIG. 1 is a perspective view of a wide-bodied civil airplane.

The wide-bodied civil airplane 1, shown diagrammatically in FIG. 1, comprises a fuselage 2, on either side of which are disposed two wings 3G and 3D, which are symmetric in all points.

Besides other aerodynamic surfaces, each wing 3G, 3D comprises leading edge lift-augmenting slats 4G, 4D, trailing edge lift-augmenting flaps 5G, 5D and spoilers 6G, 6D.

Figure 2:
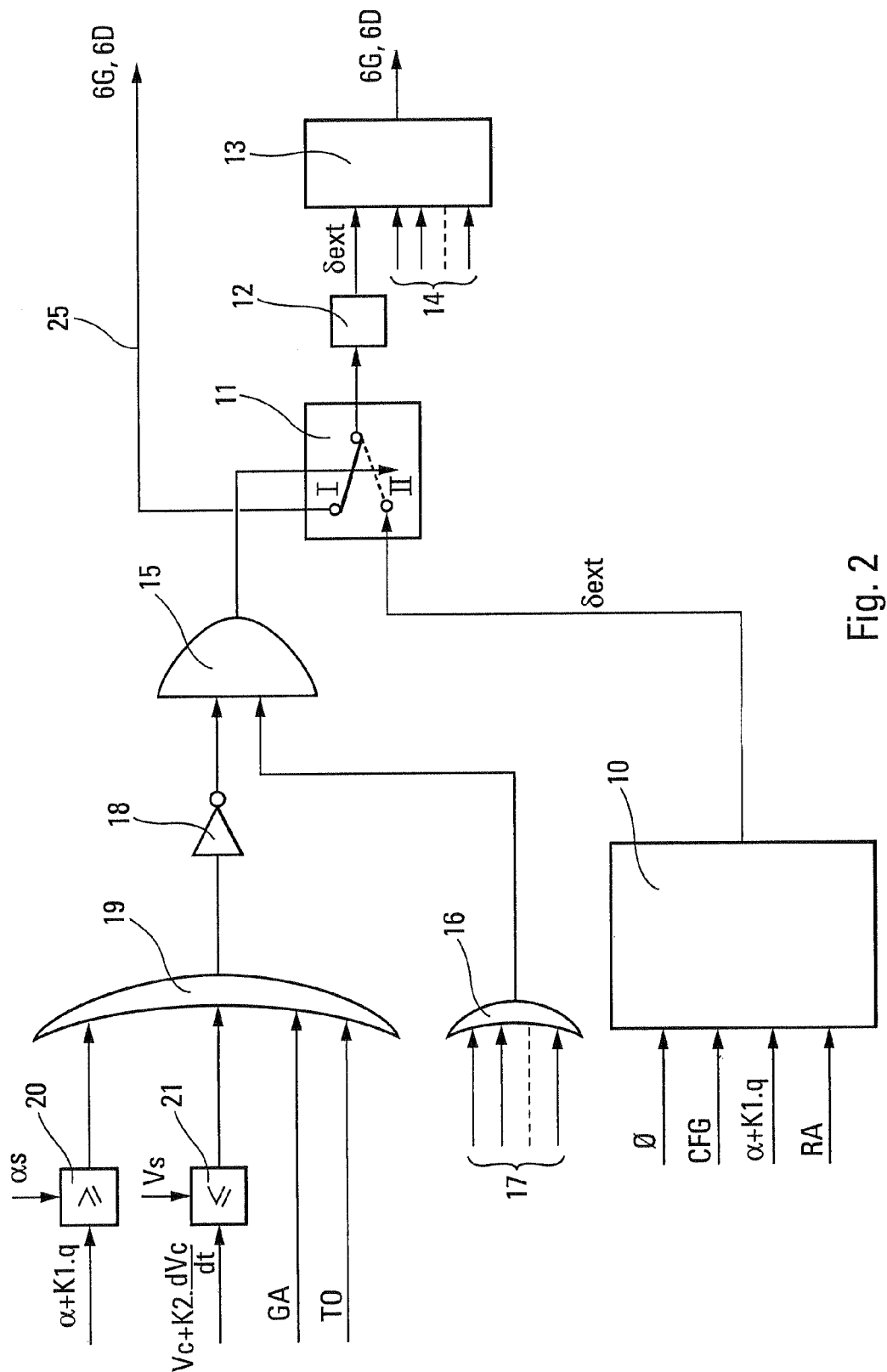
FIG. 2 is a schematic diagram illustrating a mode of implementation of the present invention.

Illustrated diagrammatically with the schematic diagram of FIG. 2 is the control of the spoilers 6G, 6D—or at least of some of them—in accordance with the present invention.

The control represented by the schematic diagram of FIG. 2 comprises a device 10 able to produce a deployment command δext, to communicate to at least some of the spoilers 6G, 6D a deployed position capable of counteracting the wake vortices produced by the airplane 1. In order to be able to produce the appropriate command δext for counteracting the current wake vortices, the device 10 receives a cue φ, representative of the present phase of flight, and a cue CFG, representative of the current lift-augmented configuration resulting from the positions of the slats 4G, 4D and of the flaps 5G, 5D. Moreover, in order to be able to take account, dynamically, of the current incidence α of the airplane on the value to be given to the command δext, the device 10 receives an incidence cue α+K1·q, in which expression K1 is a positive constant coefficient and q the pitch rate of the airplane 1. Thus, the command δext can vary progressively as a function of the incidence of the airplane 1. Finally, so as to produce the command δext only when really necessary (near airports) for airplanes that are following and not while cruising for example, the device 10 receives the radiometric altitude cue RA.

According to a particular feature of the present invention, the device 10 produces a command δext as soon as it receives the cue CFG, notifying it of the deployment of the slats 4G, 4D and/or of the flaps 5G, 5D.

The output of the device 10, on which output the command δext appears, can be connected, by way of a switch 11 with two positions I and II and of a filter 12, to an adder 13 of control signals for spoilers 6G, 6D.

As well as the command δext, the adder 13 receives several commands 14 corresponding for example respectively to controls for the airplane 1 in terms of roll, yaw, airbrakes, etc.

The switch 11 is controlled by a signal appearing at the output of a logic gate 15, of AND type. One of the inputs of the gate 15 is fed with the output from a logic gate 16, of OR type, receiving, at its inputs, cues 17 representative of the various configuration states conferred on the wings 3G, 3D by the slats 4G, 4D and the flaps 5G, 5D. The other input of the gate 15 is connected, by way of an inverter 18, to the output of a logic gate 19, of OR type.

At its inputs, the logic gate 19 receives:

the result of the comparison, in a comparator 20, between the expression α+K1·q and an incidence threshold αs;

the result of the comparison, in a comparator 21, between the expression Vc+K2·dVc/dt and a speed threshold Vs, Vc being the current speed of the airplane 1, K2 a constant positive coefficient and dVc/dt the current acceleration of said airplane;

a cue GA representative at least of the fact that the airplane 1 is instigating a go-around operation, after having attempted to land, this cue GA possibly being moreover representative of the failure of at least one of the engines of the airplane 1; and a cue TO representative at least of the fact that the airplane 1 is attempting a go-around operation and possibly of the additional fact that one of the engines of the airplane 1 has failed.

Thus, from the forgoing, it will readily be understood that:

the spoilers 6G, 6D (or some of them) are automatically ordered to deploy when the slats 4G, 4D and/or the flaps 5G, 5D are themselves ordered to deploy; and the spoilers 6G, 6D thus automatically deployed are ordered automatically to retract when:

the incidence α is equal to or greater than the threshold αs, or the speed Vc is equal to or less than the threshold Vs, or a go-around maneuver is in progress, or a take-off maneuver is in progress.

Indeed, when at least one of these four conditions exists, the OR gate 19 emits a signal, which is inverted by the inverter 18 so that the AND gate 15 is disabled and toggles the switch 11 into the position I interrupting the link between the control device 10 and the spoilers 6G, 6D, thereby ordering the spoilers 6G, 6D to retract by way of the line 25.

Conversely, in the absence of these four conditions, the AND gate 15 is enabled and toggles the switch 11 into the position II, so that the spoilers 6G, 6D are ordered to deploy by the control device 10.

Figure 3:
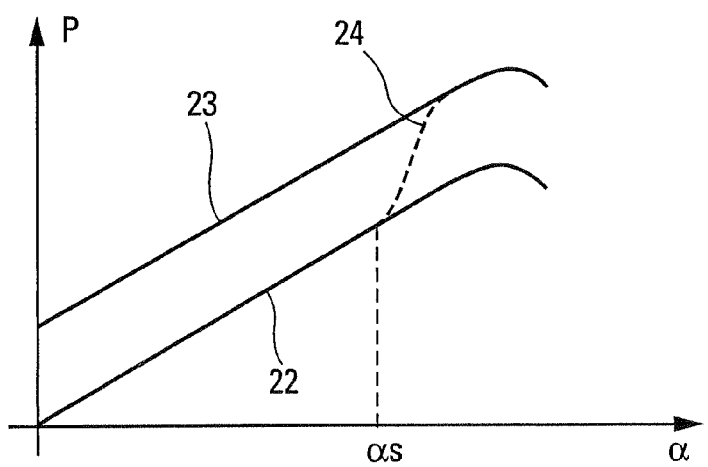
FIG. 3 is a chart illustrating the variation in lift of the airplane, upon retraction of the spoilers.

In the chart of FIG. 3, the curve 22 represents the variation in the lift P of the airplane 1 as a function of the incidence α, when the slats 4G, 4D, the flaps 5G, 5D and the spoilers 6G, 6D are deployed (switch 11 in position II).

If the switch 11 moves to position I, the spoilers 6G, 6D retract, so that the lift of the airplane 1 moves from the curve 22 to a higher curve 23, via the transition 24. The filter 12 allows a smooth transition 24.

The invention claimed is:

1. A method for piloting, on approach and on landing, an aircraft having two symmetric wings including deployable and retractable lift-augmenting aerodynamic surfaces configured to confer one of a smooth configuration and at least one lift-augmented configuration on said wings, and deployable and retractable spoilers, the method comprising:

carrying at least two symmetric spoilers respectively by said wings, which are deployed in a symmetric manner so as to counteract wake vortices produced by said aircraft;

automatically ordering the spoilers to deploy when said lift-augmenting aerodynamic surfaces are ordered to deploy so as to confer an approach and landing lift-augmented configuration on said wings;

calculating three conditions as follows:

whether an angle of incidence $\alpha$ of the aircraft is equal to or greater than an incidence threshold $\alpha s$, whether the speed Vc of the aircraft is equal to or less than a speed threshold Vs, and whether the aircraft is instigating a go-around maneuver; and automatically ordering the deployed spoilers to retract when at least one of the three conditions holds.

2. The method as claimed in claim 1, wherein said incidence threshold $\alpha s$ is less than the stalling incidence with spoilers retracted minus a safety margin and greater than an incidence allowing the aircraft to perform at least one 40° turn, when said aircraft is at its approach speed.

3. The method as claimed in claim 2, wherein said incidence safety margin depends on the duration of retraction of said spoilers.

4. The method as claimed in claim 1, wherein said speed threshold Vs is greater than the stalling speed with spoilers retracted plus a safety margin and less than the approach speed, with a margin of at least 10 to 15 kts.

5. The method as claimed in claim 4, wherein said speed safety margin depends on a duration of retraction of said spoilers.

6. The method as claimed in claim 1, wherein the position of the incidence $\alpha$ with respect to said incidence threshold $\alpha s$ is determined by comparing the expression $\alpha + K1.q$ with said threshold $\alpha s$, K1 being a positive constant coefficient and q being a pitch rate of said aircraft.

7. The method as claimed in claim 1, wherein a position of the speed Vc of the aircraft with respect to said speed threshold Vs is determined by comparing an expression Vc+K2.dVc/dt with said threshold Vs, K2 being a positive constant coefficient and dVc/dt an acceleration of said aircraft.

8. The method as claimed in claim 1, where, below an altitude threshold, said incidence threshold is increased and said speed threshold is decreased.

9. A device for implementing the method as claimed in claim 1, piloting an aircraft, on approach and on landing, the aircraft having two symmetric wings including deployable and retractable lift-augmenting aerodynamic surfaces conferring one of a smooth configuration and at least one lift-augmented configuration on said wings, said device comprising:

a deployment device configured to deploy in a symmetric manner at least two symmetric spoilers respectively carried by said wings, so as to counteract wake vortices produced by said aircraft;

a first comparison device configured to compare an incidence a of the aircraft with said incidence threshold $\alpha s$;

a second comparison device to compare the speed Vc of the aircraft with said speed threshold Vs;

a logic device configured to receive results of the comparisons performed by said first and second comparison devices, and to receive a cue representative of a go-around maneuver and cues representative of the various configuration states conferred on said wings by said lift-augmenting aerodynamic surfaces; and a switching device controlled by said logic device and allowing one of deployment of said spoilers by said deployment device and retraction of said spoilers.

10. An aircraft implementing the method specified under claim 1.

* * * * *